April 2, 1946.  A. E. HANSEN  2,397,660
ARCH HOOK
Filed Oct. 23, 1944
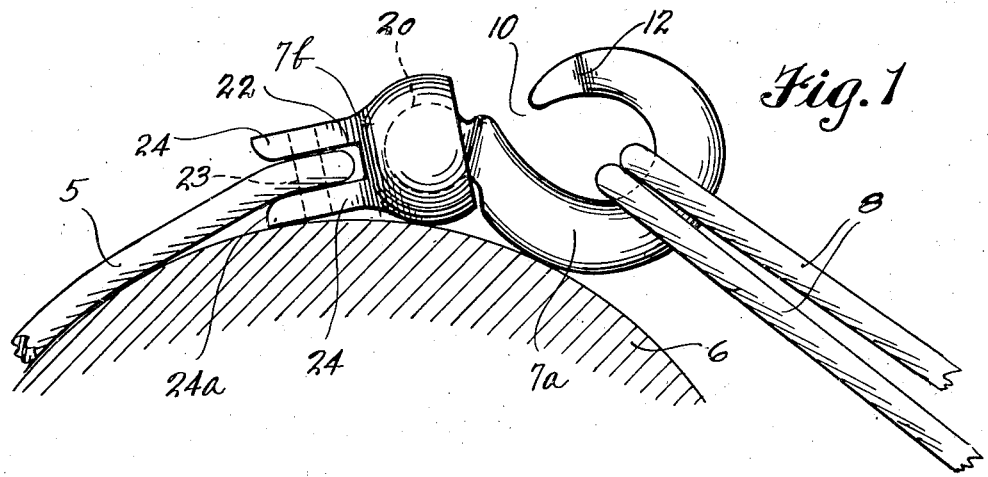
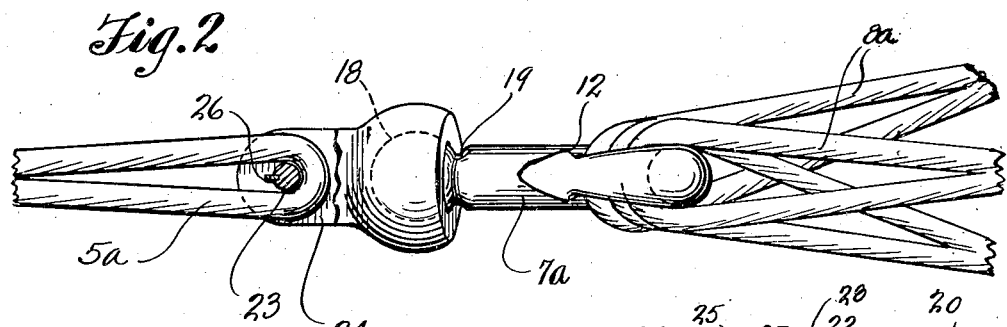
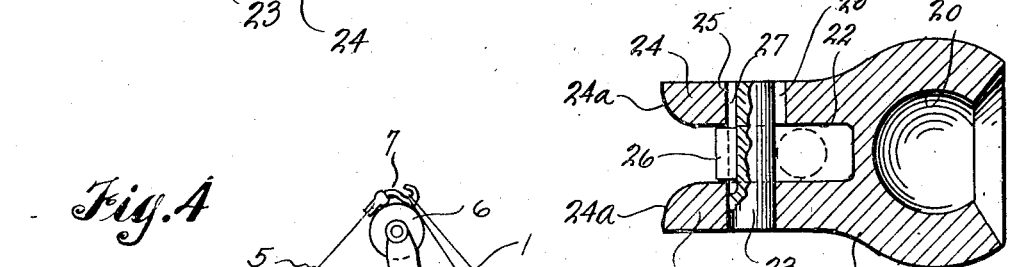
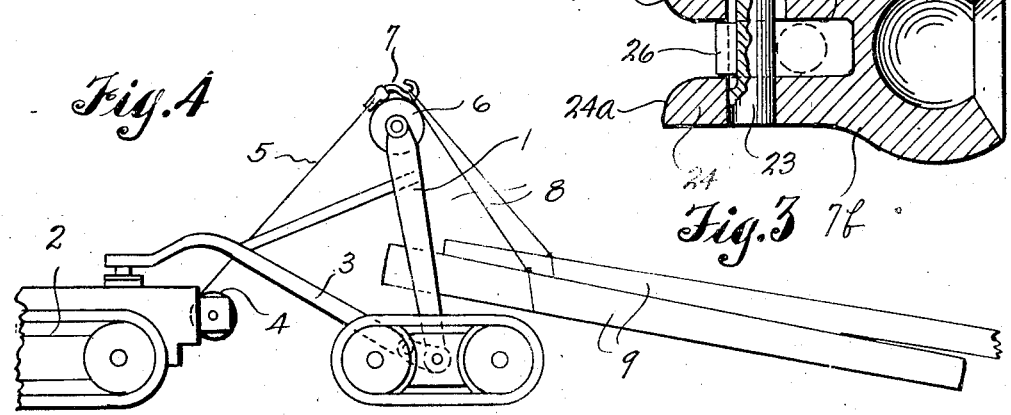
INVENTOR
ARTHUR E. HANSEN
BY
Cook & Robinson
ATTORNEY Patented Apr. 2, 1946

2,397,660

UNITED STATES PATENT OFFICE 2,397,660

ARCH HOOK

Arthur E. Hansen, Seattle, Wash., assignor to Young Iron Works, Seattle, Wash., a corporation of Washington Application October 23, 1944, Serial No. 560,054

1 Claim. (Cl. 294—74)

This invention relates to logging hooks and it has reference more particularly to improvements in logging hooks of that particular kind designed for use in high arch logging operations and which are known in the industry as "arch hooks"; such operations comprising the yarding of logs by use of a tractor-drawn arch, equipped at its top with a roller over which a winch line, extended from a winch drum on the tractor, passes, and which line has a hook at its end to which the eye splice loops of a plurality of choker lines may be applied in order that the logs to which the choker lines are applied, may be drawn in to the arch and there held with their forward ends suspended while they are dragged by the tractor to the unloading point.

It is the principal object of this invention to provide an improved type of arch hook for such logging operations, but not necessarily confined thereto, particularly in the provision of a swivel connection with the hook shank that permits easier manipulation of the hook for the application of the choker lines thereto and provides for relative turning of the hook and the winch line to which it is attached, which is quite desirable and is essential to expeditious and most practical use of the hook.

It is also an object of this invention to provide an arch hook that combines the desirable swivel action with the features of the hook of my United States Letters Patent No. 2,209,600, that was issued on July 30, 1940.

Another object of this invention is to provide a hook designed for the particular use above stated, that, by reason of the swivel action provided between the hook shank and swivel to which the winch line is affixed, will permit the hook shank to turn automatically in passing over the arch roller to a position that will give support thereto and overcome the tendency of breaking the hook under the extremely heavy loads to which it is subjected in its normal and intended use.

Still other objects of the invention reside in the details of construction of the various parts thereof, in their combination, and in their mode of use as will hereinafter be fully described.

In accomplishing the above stated, and other objects of the invention, I have provided the improved details of construction, the preferred forms of which are illustrated in the accompanying drawing, wherein:

Fig. 1 is a side view of the hook embodied by the present invention, showing it attached to a winch line and with choker lines applied to the hook seat. Also showing the usual manner in which the hook engages with the arch roller in passing thereover.

Fig. 2 is a top view of the parts as shown in Fig. 1.

Fig. 3 is an enlarged sectional detail of parts of the hook showing the manner of securing the winch line attaching pin in the swivel block.

Fig. 4 is a diagrammatic illustration of the application of the hook in high arch logging equipment.

Referring more in detail to the drawing: The present hook is especially adapted for use in connection with the winch lines or main lines used in high arch logging operations, and in this use it is anticipated that the hook will be affixed to the outer end of the winch line; that the winch line will be extended over the roller at the top of an arch, and that the eye splice loops of one or more choker lines will be applied to the hook seat. Furthermore, it is anticipated that the arch will be drawn by a tractor equipped with the winch and that in the normal use of the hook, it may be required to pass over the arch roller while under heavy strain.

In my U. S. Patent No. 2,209,600 above mentioned, I have illustrated and described a hook that has features that have proved to be especially useful in high arch logging operations, but which does not provide for the present swivel action of the hook shank in its connection with the winch line. I have found that there are disadvantages due to the absence of this swivel action; one being due to the manner in which the hook shank is most apt to engage with the arch roller and which is most apt to cause breakage of the hook under heavy strain, and another being in the difficulty in handling the winch cable when it is required that it be manually drawn out over the roller to the vicinity of the logs that are to be attached thereto by means of the choker lines.

In giving consideration to this invention, it is well to understand that such hooks are used in connection with wire rope cables or winch lines that may range from three-quarters of an inch to one and a quarter inches in diameter, and are extremely stiff and heavy, and in drawing these lines out over the arch roller to the vicinity of the logs that are to be connected thereto, the workman usually places the hook over his shoulder and grasps the hook shank with both hands. Considerable effort is required to draw out and carry the cable to its required length. Furthermore, the cable always has the tendency to turn or twist as it is being drawn out and this adds to the difficulty in its handling. However, with the present embodiment of the swivel in the hook, the line will be free to turn or unwind as may be required as it is drawn out without causing any added difficulty to the workman in holding on to the hook.

In Fig. 4, 1 designates what may be a typical high arch, 2 a tractor to which the high arch is attached for towing by a tongue 3, 4 a winch drum mounted on the tractor, and 5 is a winch line or cable passing from the drum over a roller 6 at the top of the arch and having an arch hook 7 at its end, to which choker cables 8 are applied for the support and transportation of the logs 9 to which the choker cables are affixed.

The hook 7 embodied by this invention, comprises a hook shank 7a and a swivel block 7b. The hook shank is of sturdy construction, and is bent to form a hook seat of such size that it will accommodate a desired or specified number of choker cables therein. Each choker cable 8 has an end equipped with an eye splice loop 8a as seen in Fig. 2, for easy application to or its removal from the hook seat, and the entrance 10 to the hook seat, as noted in Fig. 1, is made quite narrow so as to prevent accidental unseating of the eye splice loops therefrom, and the hook end preferably is equipped with an arrow point thus providing lateral shoulders 12 that further insure against accidental unseating of the eye splice loops of the choker lines from the seat.

At its base end, the hook shank is formed with a spherical knob 18 that is connected with the body of the hook shank by a rather restricted neck portion 19. The knob 18 is retained, with swivel action, in a complemental socket 20 opening to one end of the swivel block 7b; the swivel block being attached at its other end to the winch line 5.

The manner of connecting the line 5 with the swivel block comprises forming an eye-splice loop 5a at the end of the line and applying this loop within a longitudinal slot 22 that opens through and to that end of the block that is opposite that end containing the socket, then passing a pin 23 through the opposite side flanges 24—24 of the block and through the eye splice loop.

It will be noted by reference to Fig. 3, that the pin 23 is round in cross section and that its end portions are fitted and contained in holes 25 that are formed in the side flanges. The end surfaces of the pin are flush with the side surfaces of the block and along one side of the pin is a key slot 27 and in this slot a key 26 is secured. The key projects from the side of the pin and is so disposed in the slot that its ends will engage with the inner surfaces of the spaced flanges, thus to retain the pin against endwise movement in the block.

The pin 23 is applied to the swivel block after the key is fixed therein, by applying it to one of the holes 25, then turning it to a position therein that the key may pass through a key slot 28 in that flange. Then the pin is rotated to a position at approximately 180°, at which the key will be disposed between the opposite side members of the eye splice loop of the winch cable, as seen in Fig. 3, and will then operate as a means to prevent the pin's turning back to that position aligned with slot 28 at which it could be removed.

The inside corner edges of the flanges 24—24 across which the line extends, are rounded off as at 24a so as to avoid cutting the cable when it is drawn thereover.

In the making of this hook, the two parts 7a and 7b are individually formed. The socket of the swivel block is left open and receives the knob of the hook shank therein for easy swiveling action without too much looseness. Then the rim of the socket is constricted by pressure about the knob to retain it, but permitting the hook to swing through an angle of about 30° in any direction and to have a free swiveling action.

The width of the flanges 24—24 is such that they will extend beyond the periphery of the loop of the eye splice 5a as a protection to the cable eye in its passing over the arch roller and to eliminate the possibility of the cable being flattened in its contact with the roller surface.

In use of this hook, it will be understood that as it passes over the arch roller the swivel block will be most apt to engage the roller as in Fig. 1, due to the fact that the two side members of the eye splice of cable 5 will lie against the roller surface and will naturally bring the block to that position. Likewise, the hook will swivel in the block and will normally turn to the position shown as soon as the sides of the eye splice engage the roller. The curvature of the roller is such that the hook will have bearing contact therewith before it has swung to its full limit in any direction relative to the block and therefore there will be no undue breaking strain placed on the neck of the hook or on the shank.

Such hooks are especially desirable where the winch line has to be manually dragged out by means of the hook over the roller for the attachment of the choker lines thereto as it permits the line to turn as may be required and thus relieves the laborer of strain on the wrists and arms that otherwise would result.

Such hooks may be made in sizes required for any particular load and may be applied to the use herein illustrated or to others without departing from the spirit of the invention.

Having thus described my invention, what I claim as new therein and desire to secure by Letters Patent is:

In combination, a fairlead roll, a winch line adapted to be drawn over said roll, and an arch hook attached to the line; said winch line having an eye-splice at its end and said arch hook comprising a swivel block having a spherical body portion formed with a socket open to one side of the body, a hook shank forming a hook seat for a plurality of choker lines, and having a spherical knob at its base and retained with swivel action in said socket; said spherical body also having spaced flanges projecting from the body opposite the socket, and containing the loop end of the eye-splice therein, and a pin extended through the flanges and eye-splice to connect the hook to the line.

ARTHUR E. HANSEN.